(12) United States Patent
Nichols et al.

(10) Patent No.: US 7,982,610 B1
(45) Date of Patent: Jul. 19, 2011

(54) CONTENT-BASED PRIORITIZING OF DEPOSITS

(75) Inventors: Michelle Nichols, Rock Hill, SC (US);
Todd Atwood, Charlotte, NC (US);
James Heddleson, Charlotte, NC (US);
Mark Waggoner, Keller, TX (US)

(73) Assignee: Bank of America Corporation, Charlotte, NC (US)

( * ) Notice: Subject to any disclaimer, the term of this patent is extended or adjusted under 35 U.S.C. 154(b) by 149 days.

(21) Appl. No.: 12/262,472

(22) Filed: Oct. 31, 2008

Related U.S. Application Data

(60) Provisional application No. 61/061,987, filed on Jun. 16, 2008.

(51) Int. Cl.
*G08B 13/14* (2006.01)
(52) U.S. Cl. .................... 340/572.1; 340/572.4
(58) Field of Classification Search ............... 340/572.1, 340/572.4, 571, 568.1, 568.7, 5.54, 5.92, 340/10.1, 10.4; 235/375, 379, 384, 385
See application file for complete search history.

(56) References Cited

U.S. PATENT DOCUMENTS

| | | | |
|---|---|---|---|
| 3,618,059 A | 11/1971 | Allen | |
| 4,352,097 A | 9/1982 | Hamann | |
| 5,453,601 A * | 9/1995 | Rosen | 705/65 |
| 5,689,240 A * | 11/1997 | Traxler | 340/573.4 |
| 5,952,920 A | 9/1999 | Braddick | |
| 5,953,423 A * | 9/1999 | Rosen | 705/65 |
| 5,963,131 A * | 10/1999 | D'Angelo et al. | 340/568.1 |
| 6,047,807 A * | 4/2000 | Molbak | 194/217 |
| 6,122,625 A * | 9/2000 | Rosen | 705/65 |
| 6,483,433 B2 | 11/2002 | Moskowitz et al. | |
| 6,633,881 B2 * | 10/2003 | Drobish et al. | 1/1 |
| 6,736,314 B2 | 5/2004 | Cooper et al. | |
| 6,788,203 B1 | 9/2004 | Roxbury et al. | |
| 6,845,905 B2 | 1/2005 | Blad | |
| 7,042,360 B2 | 5/2006 | Light | |
| 7,212,992 B1 | 5/2007 | Kanevsky et al. | |

(Continued)

FOREIGN PATENT DOCUMENTS

DE 4019265 C1 11/1991

(Continued)

OTHER PUBLICATIONS

Non-Final Office mailed Mar. 12, 2010 issued in related U.S. Appl. No. 12/263,041.

(Continued)

*Primary Examiner* — Van T. Trieu
(74) *Attorney, Agent, or Firm* — Banner & Witcoff, Ltd.; Michael Springs

(57) ABSTRACT

As deposit bags containing monetary packages arrive at a cash handling facility contents of the deposit bags are inspected and assigned to a teller for processing. An automatic identification system may detect the presence of the deposit bag, the monetary packages, and/or the personnel handling the cash at various custody points at the cash handling facility. Such information may be used to determine the priority at which the monetary package may be processed. Further, a plurality of tellers may be assigned to process the monetary package in the cash handling facility. Each teller's workflow may be tracked based on the presence of monetary packages that are already being processed at the teller's station. Therefore, the monetary packages may be prioritized and may be assigned to a teller that is capable of handling the processing of the monetary package.

21 Claims, 5 Drawing Sheets

U.S. PATENT DOCUMENTS

| | | | |
|---|---|---|---|
| 7,348,886 B2 * | 3/2008 | Himberger et al. | 340/572.1 |
| 7,375,638 B2 | 5/2008 | Light | |
| 7,474,217 B2 * | 1/2009 | Himberger et al. | 340/572.1 |
| 7,659,816 B2 | 2/2010 | Wandel | |
| 7,714,708 B2 | 5/2010 | Brackmann et al. | |
| 7,719,423 B2 * | 5/2010 | Himberger et al. | 340/572.1 |
| 7,748,610 B2 * | 7/2010 | Bell et al. | 235/379 |
| 2001/0054643 A1 | 12/2001 | Siemens | |
| 2002/0194122 A1 | 12/2002 | Knox et al. | |
| 2003/0011466 A1 | 1/2003 | Samuel et al. | |
| 2003/0050891 A1 | 3/2003 | Cohen | |
| 2003/0061153 A1 | 3/2003 | Birdsong et al. | |
| 2003/0122671 A1 * | 7/2003 | Jespersen | 340/568.1 |
| 2003/0208431 A1 | 11/2003 | Raynes et al. | |
| 2003/0234719 A1 * | 12/2003 | Denison et al. | 340/5.23 |
| 2004/0056767 A1 | 3/2004 | Porter | |
| 2004/0083149 A1 | 4/2004 | Jones | |
| 2004/0100379 A1 | 5/2004 | Boman et al. | |
| 2005/0091129 A1 | 4/2005 | Tien | |
| 2005/0108164 A1 | 5/2005 | Solafia, III et al. | |
| 2005/0183928 A1 | 8/2005 | Jones et al. | |
| 2005/0273347 A1 | 12/2005 | Dudley et al. | |
| 2006/0282277 A1 | 12/2006 | Ng | |
| 2007/0005452 A1 | 1/2007 | Klingenberg et al. | |
| 2007/0008118 A1 * | 1/2007 | Kassiedass | 340/539.21 |
| 2007/0012602 A1 | 1/2007 | Baldassari et al. | |
| 2007/0034693 A1 | 2/2007 | Jouvin et al. | |
| 2007/0063016 A1 | 3/2007 | Myatt et al. | |
| 2007/0226142 A1 * | 9/2007 | Hanna et al. | 705/41 |
| 2007/0282724 A1 | 12/2007 | Barnes | |
| 2008/0005019 A1 | 1/2008 | Hansen | |
| 2008/0103959 A1 | 5/2008 | Carroll et al. | |
| 2008/0149706 A1 | 6/2008 | Brown | |
| 2008/0199155 A1 | 8/2008 | Hagens et al. | |
| 2008/0223930 A1 | 9/2008 | Rolland et al. | |
| 2008/0262949 A1 | 10/2008 | Bond et al. | |
| 2008/0265019 A1 | 10/2008 | Artino et al. | |
| 2008/0303903 A1 | 12/2008 | Bentley et al. | |
| 2009/0006249 A1 | 1/2009 | Morgan et al. | |
| 2009/0006250 A1 | 1/2009 | Bixler et al. | |
| 2009/0032580 A1 | 2/2009 | Blachowicz et al. | |
| 2009/0051566 A1 | 2/2009 | Olsen et al. | |
| 2009/0051769 A1 | 2/2009 | Kuo et al. | |
| 2009/0164364 A1 | 6/2009 | Galit et al. | |
| 2009/0187482 A1 | 7/2009 | Blount et al. | |

FOREIGN PATENT DOCUMENTS

| | | | |
|---|---|---|---|
| DE | 4429815 | * | 2/1996 |
| DE | 19512045 | * | 10/1996 |
| DE | 19846452 | * | 12/1999 |
| DE | 20013021 | * | 1/2001 |
| DE | 102004039365 | * | 2/2006 |
| DE | 102005047711 | * | 4/2007 |
| EP | 1477949 | * | 4/2004 |
| WO | 99/33040 A | | 7/1999 |
| WO | 03/034359 A | | 4/2003 |
| WO | 2005041385 | * | 5/2005 |
| WO | 2005106722 | * | 11/2005 |

OTHER PUBLICATIONS

Office Action from related U.S. Appl. No. 12/262,534 mailed Jun. 24, 2010 (17 pages).
Office Action from related U.S. Appl. No. 12/262,908 mailed Mar. 8, 2010 (17 pages).
Office Action from related U.S. Appl. No. 12/262,908 mailed Aug. 23, 2010 (12 pages).
Office Action from related U.S. Appl. No. 12/262,432 mailed Aug. 18, 2010 (12 pages).
Office Action from U.S. Appl. No. 12/263,041, mailed Sep. 2, 2010.
Powerpoint Presentation, DTS Product Overview, IFS, Apr. 2006, 17 pages.
Durbin, "Ford's F-150 goes high-tech", retrieved from <http://www.wheels.ca/article/173134>, Feb. 6, 2008, 4 pages.
Monthly Minutes from Banking Technology Operations Standing Committee (BTO), dated Mar. 20, 2007, 2 pages.
Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.
Powerpoint Presentation, Guck, "PakTrak", Cash Shipment Package Tracking Concept Overview, Draft-Version 1.0, Mar. 14, 2008, 17 pages.
Powerpoint Presentation, RFID in Banking, May 21, 2008, 12 pages.
Monthly Minutes for RFID SIG dated Mar. 19, 2008, 2 pages.
International Search Report and Written Opinion from corresponding PCT Application No. PCT/US2009/047452 mailed on Aug. 25, 2009.
Office Action from related U.S. Appl. No. 12/262,448 mailed Sep. 15, 2010, pp. 1-18.
Office Action from related U.S. Appl. No. 12/262,526 mailed Sep. 16, 2010, pp. 1-12.
Office Action from U.S. Appl. No. 12/263,041, mailed Jan. 26, 2011.
Office Action from related U.S. Appl. No. 12/262,928 mailed Nov. 10, 2010, pp. 1-14.
Office Action from related U.S. Appl. No. 12/262,523 mailed Nov. 9, 2010, pp. 1-9.
Office Action from related U.S. Appl. No. 12/263,115 mailed Nov. 16, 2010, pp. 1-11.
Office Action from related U.S. Appl. No. 12/262,532 mailed Nov. 26, 2010, pp. 1-8.
Office Action from related U.S. Appl. No. 12/262,526 mailed Nov. 23, 2010, pp. 1-10.
Office Action from related U.S. Appl. No. 12/262,432 mailed Dec. 7, 2010, pp. 1-13.
Non-Final Office Action mailed Feb. 3, 2011 issued in related U.S. Appl. No. 12/262,522.
Notice of Allowance from U.S. Appl. No. 12/262,502, mailed Apr. 14, 2011.
Office Action from U.S. Appl. No. 12/262,928, mailed Apr. 27, 2011.

* cited by examiner

CONTENT-BASED PRIORITIZING OF DEPOSITS

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of customers, armored carriers, the Fed (Federal Reserve), and/or a network of client facing devices including but not limited to automatic teller machines (ATMs), cash handling facilities, banking centers, safes, and cash recyclers, and other cash handling devices. The costs of depositing, distributing, and managing cash across a major bank, as well as the amount of daily excess cash carried by such a bank, can be on the order of billions of dollars.

Today's client deposit process does not adequately allow clients to view the status of their deposit bag as it makes it way from the client's site where the deposit was prepared to the financial institution or financial institution's representative and potentially on to proof and bulk file. The proof and bulk file is the processing and storing of checks. Oftentimes, a deposit will contain cash and checks (and possibly other negotiable instruments). The deposit arrives at a deposit handling facility and the deposit is "split" into the cash and the checks. The cash is processed within a cash handling facility and the checks are processed through proof and bulk file.

Deposit bags are handled multiple times in the end-to-end cash supply process, which increases potential errors, opportunity for theft, and complicates finding missing transactions or understanding where errors occurred and assigning fiduciary responsibility for those errors. Pertinent pieces of deposit data are typically manually entered and reentered into various systems throughout the end-to-end processing of the deposit. The collaboration and sharing of information across multiple organizations and with multiple vendors may make this process very complex and increases risk to the financial institution and its customers/clients.

Typically, deposit bags arrive at a cash handling facility and the cash is counted by hand, and then reconciled with a paper ledger provided by the armored carrier. The armored carrier must wait until the manual count of the deposit bags matches the paper ledge and all errors are reconciled. Only after the deposit bags are reconciled with the paper ledger, may the deposit bags be assigned to a teller for counting, inspection, and/or redistribution. Deposit bags are manually assigned to tellers and workflow is managed based upon a human manager making subjective decisions regarding a particular teller's workflow capacity. The teller must take each deposit bag to a teller station and manually enter the declared amounts of cash and negotiable instruments that are present in the deposit bag before the teller is allowed to begin verifying the cash. Once the teller verifies the cash, the cash may be taken to a sorter room for sorting may be further processed, counted, inspected, or the like. The cash then "strapped," which is a process that gathers a particular amount of cash and physically secures a cash strap around it. Strapped physical cash is stored within the cash handling facility. This entire process is expensive, time-consuming, and prone to errors.

The contents of deposit bags are assigned to tellers for processing at the cash handling facility. A person, such as a workflow manager, often controls the distribution of the deposit bags and/or its contents to a particular teller based upon subjective analysis of the teller's workload and/or work capacity. The workflow manager may not know what contents are in the deposit bags and may assign the deposit bags for processing by a teller without consideration for the level of priority (urgent, low-priority, etc.) at which the contents need to be processed. The workflow manager is not able to prioritize the processing of the deposit bags nor is the workflow manager able to select the best teller for processing the deposit bag. Such a system is inefficient, error prone, and increases costs associated with processing these deposit bags.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, identify potential theft, fraud or embezzlement, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed monetary package) may be recognized much earlier, even prior to actual deposit or arrival of the package at the processing site.

Another potential benefit of centralized monetary package tracking may include improved cash processing and teller assignment at cash handling facilities. An automatic identification system, such as a radio-frequency identification (RFID) system, may detect the presence of an item, such as a monetary package, e.g., deposit bag, cash strap, etc. at a particular location at a cash handling facility. When deposit bags are delivered to the cash handling facility for processing, the contents of the deposit bag are counted and assigned to a teller for further processing (i.e., counting, strapping, storing, etc.). The automatic identification system may track the deposit bag and its contents as they are processed at the cash handling facility. The RFID system may also enable an automatic distribution of the deposit packages to the contents of the deposit packages and the allocation of the tellers that may be responsible for handling the contents of the deposit packages and the distribution of the work to each teller.

A plurality of tellers may analyze and process the contents of the deposit bags when they arrive at the cash handling facility. Each teller may have a workload and/or work capacity, which are indicative of the number of deposit bags that they are currently responsible for processing. The teller's workload may indicate the amount of time that will be required for the teller to complete the processing of the monetary package. Deposit bags may be assigned to a teller based upon the workload of the teller and/or the contents of the deposit bag. The tellers having a low quantity of work may be assigned a new project (processing the deposit bag) before those tellers having a high quantity of work. Further, some deposit bags may contain cash that is in high demand or needs to be processed on an expedited basis. These deposit bags may be identified and assigned to a teller before deposit bags with a lower priority.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
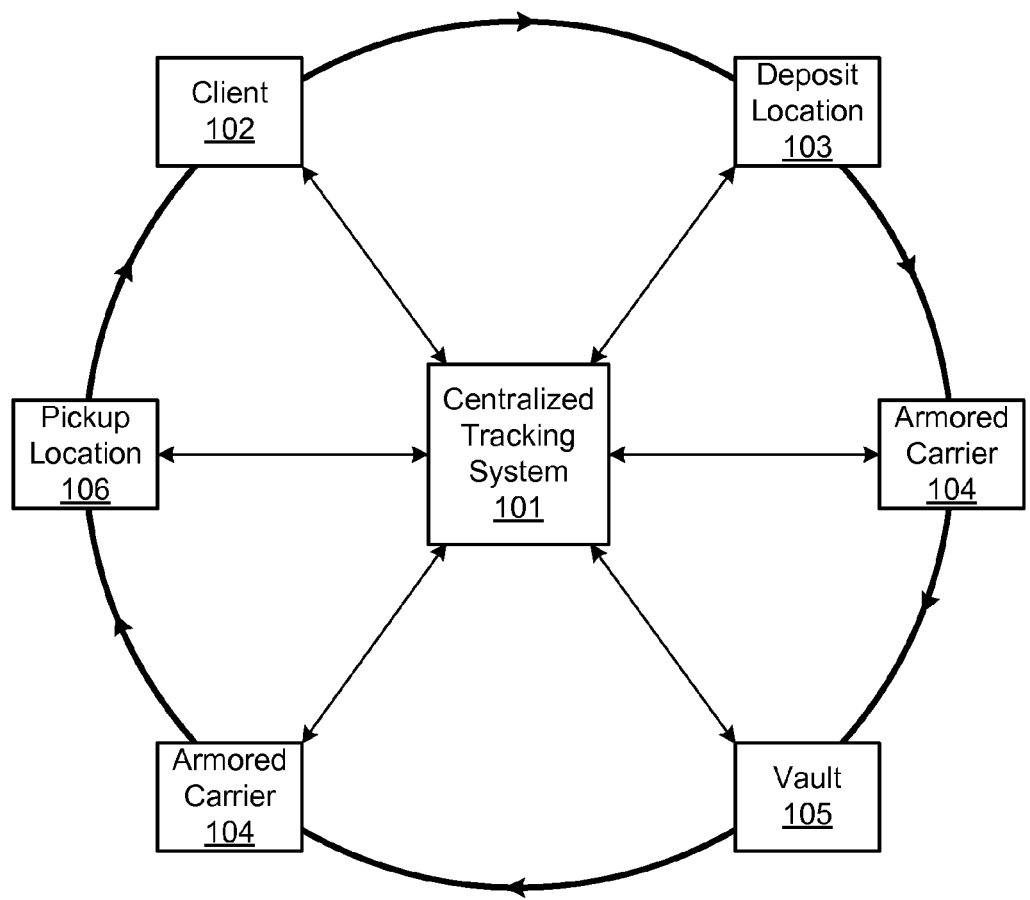
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at phone 102a or terminal 102b through a wireless network or the Internet.

Deposit location 103 is the location at which client 102 releases custody of the deposit (such as in the form of a monetary package). This custody may be released by, for instance, depositing the monetary into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104a/104b (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
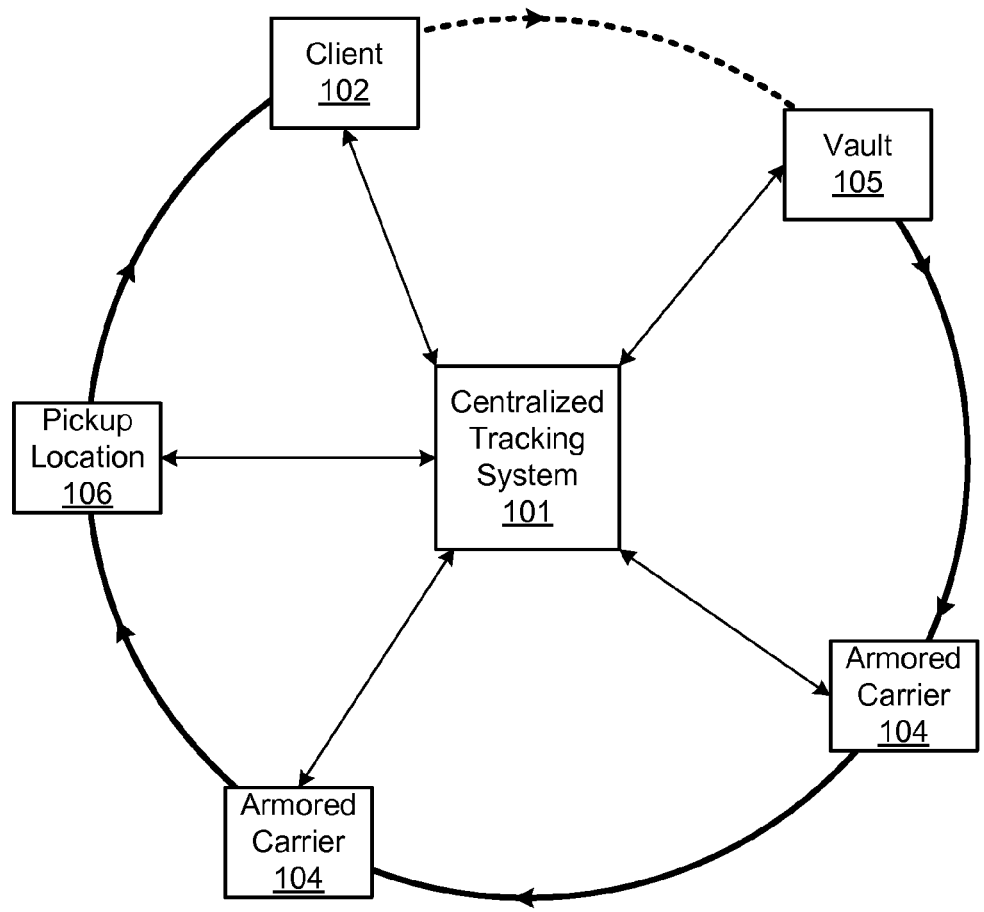
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
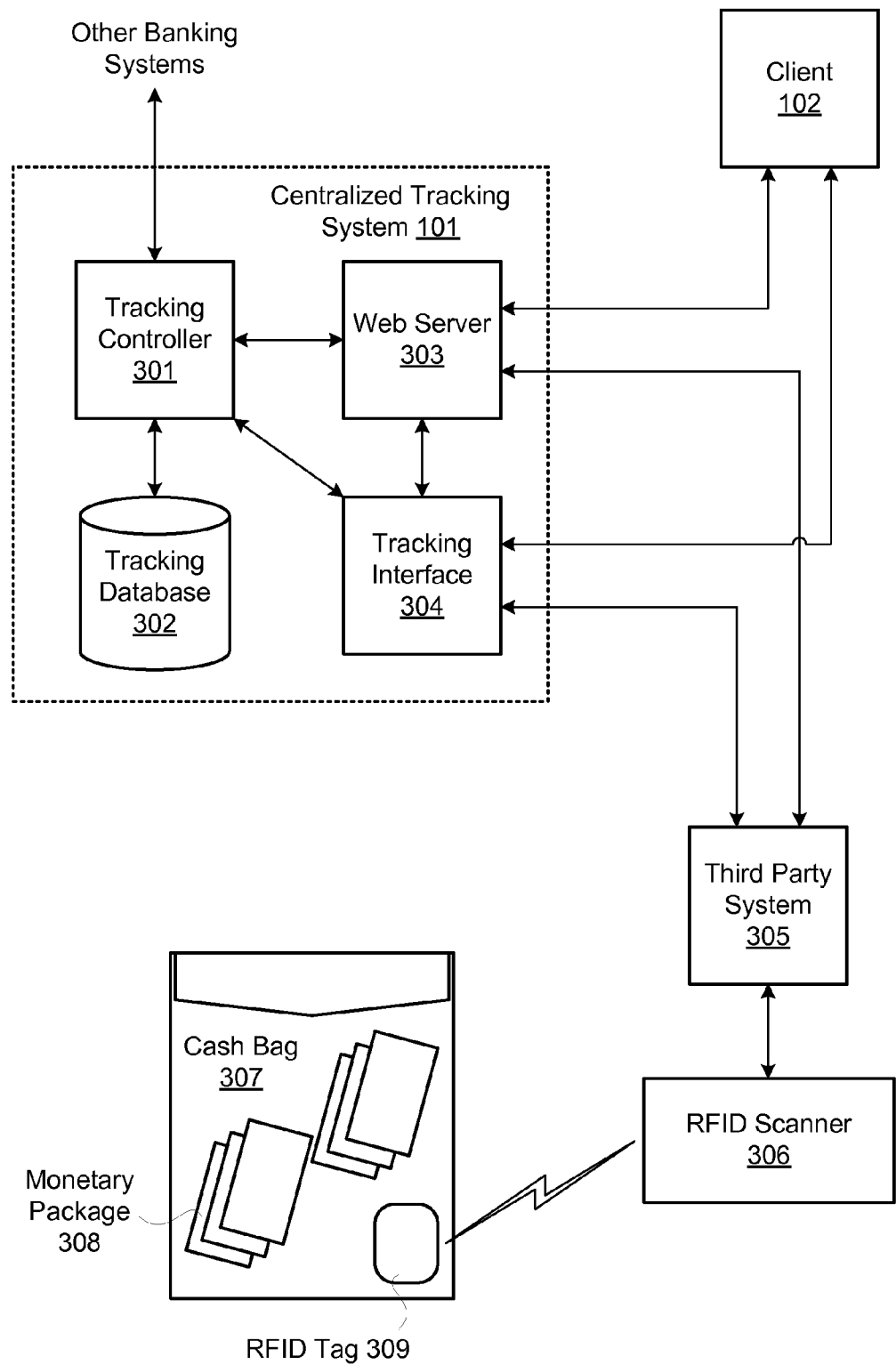
FIG. 3 is a functional block diagram of an illustrative monetary package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is contained inside or otherwise attached to a bag 307 that also contains a quantity of monetary items 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

RFID tag 309 may be a passive RFID tag that does not contain its own power source. Rather, a passive RFID tag (e.g., its memory, controller, and transmitter) is powered by power inherent to a signal that is received from RFID scanner 306 or another signal source. Alternatively, RFID tag 309 may be an active RFID tag that contains its own power source.

The above discussion in connection with FIGS. 1-3 describes but a few examples of how monetary package tracking might be implemented. These and other implementations, as well as various features that may be provided in connection with monetary package tracking, will be discussed in further detail below.

Figure 4:
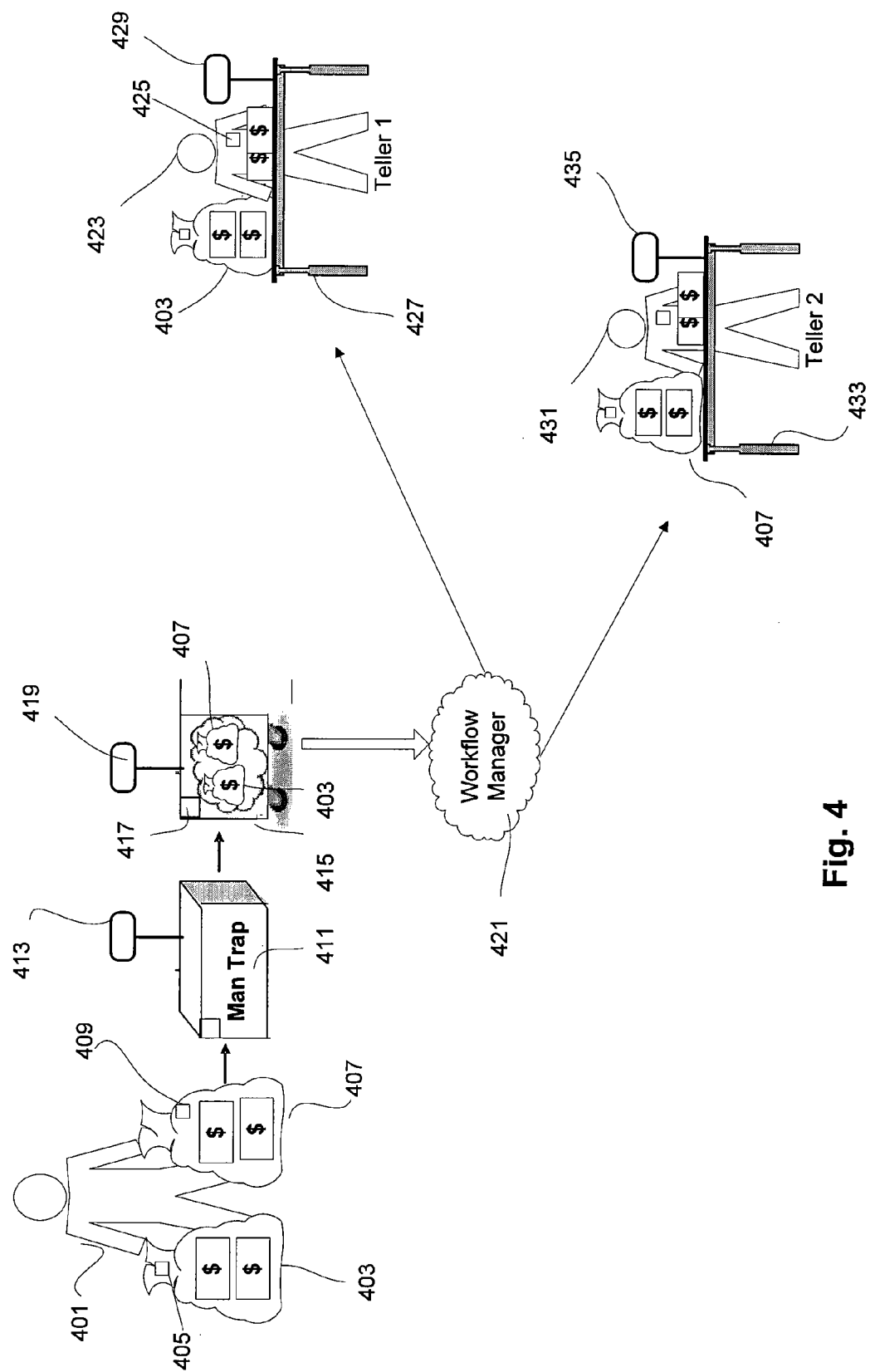
FIG. 4 illustrates one example cash handling facility according to aspects described herein.

FIG. 4 is an example of a workflow manager at a cash handling facility. One or more monetary packages may be delivered to a cash handling facility for processing. The monetary packages may be delivered in any acceptable fashion such as via armored carrier, personal delivery, or virtual delivery (an electronic transfer of funds). The monetary package is confirmed as being physically (or virtually) present at the cash handling facility and the contents of the monetary package are inspected. The monetary package may include any item along the cash supply chain such as deposit bags, credit and debit cards, cash bags, cash straps, receipts, negotiable instruments, coins, and the like. This process may also be applied to check processing as well. Any form of financial transaction may implement this workflow manager.

The monetary packages may be transferred between locations, or "custody points" within the cash handling facility. Each custody point may be a specific location at which the cash is handled by a machine or a person. In some cases, the monetary packages may be processed at the custody point. For example, a first custody point may be a receiving point at which an armored carrier delivers a deposit bag containing a plurality of monetary packages. After confirmation that the delivery was securely executed, the monetary packages may be transferred to a second custody point, such as a man trap 411 or a smart cart 415, such as those illustrated in FIG. 4.

In the example illustrated in FIG. 4, an armored carrier 401 delivers a first monetary package 403 having a first RFID tag 405 and a second monetary package 407 having a second RFID tag 407 to a cash handling facility. The cash handling facility may accept the delivery at a receiving point, such as a man trap 411. The receiving point may have an automatic identification scanner that may automatically identify the monetary package 403, 407. As shown in FIG. 4, an RFID scanner 413 may be positioned at the man trap 411 (or any receiving point). The RFID scanner 413 may detect the physical presence of the RFID tags 405 and 409 that are attached to the first monetary package 403 and the second monetary package 407, respectively. The RFID scanner 413 may receive an electronic signal from the RFID tags 405 and 409 that contains identifying information. The electronic signal may also contain any other information, such as information that describes the contents of the monetary package to which the RFID tag is attached.

Custody of the monetary packages may be transferred from the man trap 411 to a smart cart 415, which also may be equipped with an RFID tag 417 and an RFID scanner 419. The RFID scanner 419 may detect the physical presence of the first monetary package 403 and the second monetary package 407 by receiving the electronic signal from their respective RFID tags 405, 409. The RFID scanner 419 may also detect the location of the smart cart 415 based upon the RFID tag 417 that is attached to the smart cart 415. For example, the RFID scanner 419 may be able to locate the position of the smart cart 415 within the cash handling facility.

In some examples, the smart cart 415 is mobile and may be moved from location to location, as shown in FIG. 4. The smart cart 415 may be able to transport the first monetary package 403 and the second monetary package 407 from the man trap 411 to a workflow manager 421 for distribution to one or more tellers. Some illustrative smart carts may include one or more sensors for sensing characteristics of the contents that may be placed on the smart cart. For example, a smart cart may include a pressure sensor that detects the weight of the contents that are placed on the smart cart. The smart cart may be able to determine the quantity of bills present on the smart cart by weighing the bills.

The workflow manager 421 is responsible for distributing the monetary packages to one or more tellers that process the contents of the monetary packages. The workflow manager 421 may monitor the workflow of each of the tellers and distribute the monetary packages based at least partially upon the current workflow of the tellers. The workflow of a teller may correspond to the amount of time that a teller would require to process a monetary package. If a teller already has a large number of monetary packages assigned for processing, the teller may not be able to process the new monetary package for a long period of time, whereas a teller having a lower workflow would be able to process the monetary package immediately. Information regarding the workflow of each teller may be stored in a memory on a computing system. Such workflow information may be used to assign monetary packages of different priority levels. For example, a monetary package having a high priority may be assigned to a teller that has a low workflow so that the teller may be able to process the cash quickly.

The workflow manager 421 may distribute any portion of the contents contained within the monetary packages 403 and 407 to a first teller 423 equipped with an RFID tag 425 at a first teller station 427. In the example illustrated in FIG. 4, custody of the first monetary package 403 is transferred from the smart cart 415 to the first teller 423 that is positioned at a first teller station 427. The first teller station 427 may be equipped with an RFID scanner 429 that may detect the presence of the first monetary package 403 when it is physically present at the first teller station 427. The RFID scanner 429 may also detect the presence of the RFID tag associated with the first teller 423 (and thus the first teller 423) at the first teller station 427 when the first teller 423 is physically present at the first teller station 427.

The first teller 423 may remove the contents of the first monetary package 403 and place them on the first teller station 427. The first teller 423 may process the contents of the first monetary package 403 by counting, sorting, evaluating the quality of the bills, or any other processing actions.

A workflow manager 421 may distribute the second monetary package 407 to a second teller 431 at a second teller station 433. An RFID scanner 435 may be positioned at the second teller station 433 and may detect the physical presence of the second monetary package 407 and the second teller 431 in much the same manner as the RFID scanner 429 positioned at the first teller station 427.

Figure 5:
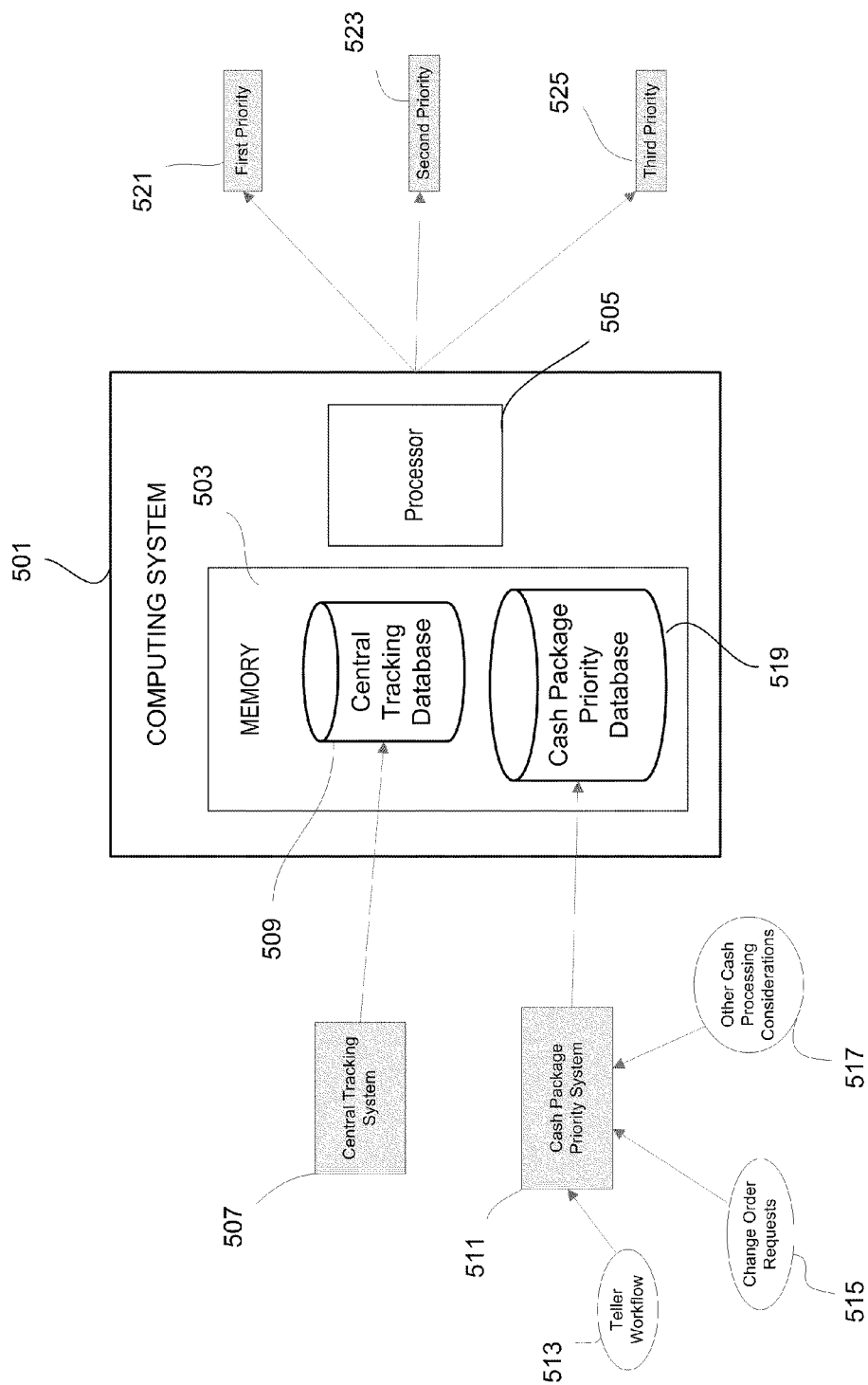
FIG. 5 is an illustrative computing system for prioritizing monetary packages according to aspects described herein.

FIG. 5 illustrates a computing system 501 containing a memory 503 and a processor 505. A central tracking system 507, such as the system described above, may receive information relating to the items (monetary packages, equipment, personnel) that are being transferred or distributed at the cash handling facility. This central tracking information may be stored in a central tracking database 509 located on the memory 503 of the computing system 501.

A monetary package priority system 511 may collect information regarding the monetary package prioritization, such as the teller workflow 513, change order requests 515, and any other cash processing considerations 517. The teller workflow 513 may be determined by the workflow manager described above in FIG. 4. Although the teller workflow 513 may not directly affect the level of priority that the monetary package is assigned, the teller workflow 513 may be considered when the workflow manager selects a teller to process a monetary package having a particular priority level. For example, a monetary package having a high priority may be assigned to a teller having a low workload so that the teller may be able to quickly attend to the processing of the monetary package.

Another aspect of prioritizing a monetary package includes receiving change order requests from a client or customer. Referring again to FIG. 5, the change order requests 515 may include information describing a client/customer request for physical cash. For example, a client/customer may request X quantity of one dollar denominations and Y quantity of ten dollar denominations. The client/customer may also request that the Y quantity of ten dollar denominations may be an expedited request. The client/customer may request change orders for normal processing or expedited processing. If an expedited request is made, the monetary package priority system 511 may assign a higher priority to the processing of such a request.

The change order requests may be internal to the financial institution. For example, the change order requests may be a request from a first location within the financial institution, such as an ATM, that a particular quantity of cash be delivered to the first location. A second location, such as a cash vault may have the physical cash that is needed to fulfill the request of the first location. In this case, the second location would send the physical cash to the first location.

Information relating to the monetary package priority system 511 may be stored in a monetary package priority database 519 on the memory 503 of the computing system 501. The processor 505 may be configured to retrieve information stored in the central tracking database 509 and/or the monetary package priority database 519 to determine the priority of monetary packages within the cash handling facility.

Each of the RFID scanners described in the RFID system above is in communication with a computing system, such as computing system 501 as illustrated in FIG. 5. The RFID system provides centralized tracking of each of the items, personnel, and custody points, along a cash supply chain and may provide current and accurate information regarding the physical location of items that are equipped with an RFID tag. Each RFID tag transmits an electronic signal that identifies the item and may optionally include information about the contents of the item. The electronic signal may be transmitted from the RFID tag attached to the item to an RFID scanner. This system, including the RFID system of tracking items, comprises the centralized tracking system 507. The information gathered may be stored in a central tracking database 509 located in a memory 503 on the computing system 501. The processor 505 may retrieve information stored in the central tracking database 509 and the monetary package priority database 519.

For example, the processor 505 may be configured to retrieve data about the location of a first monetary package that arrived at the cash handling facility. The first monetary package may be divided into three portions: a first portion, a second portion, and a third portion (not shown). These portions of the monetary package may correspond to different denominations of cash. In some examples, a high priority may be assigned to exchanging the high denominations for a lower denomination as a first priority 521, a second or medium priority to exchanging unfit bills for fit bills as a second priority 523, and a third or lower priority to counting and strapping physical cash. Any suitable factor, such as the contents of the monetary packages may be considered during the determination of the priority of processing the monetary packages. Such priority information may be useful in determining which teller may be assigned the responsibility of processing the physical cash.

The workflow manager illustrated in FIG. 4 and the prioritization computing system illustrated in FIG. 5. may operate independently. In an alternative example, the workflow manager illustrated in FIG. 4 may be another criterion on which the prioritization of the monetary packages occurs that is illustrated in FIG. 5.

However, each of them provides useful information to increase the efficiency of the other system. For example, the workflow manager monitors the workflow of tellers to provide efficient processing of monetary packages within the cash handling facility. The prioritization system may assign a priority to each monetary package when it arrives at the cash handling facility. After a priority is assigned to each monetary package, the monetary packages may be assigned to one of a plurality of tellers by a workflow manager. The workflow manager may rely upon the workflow information gathered during the workflow's manager's monitoring the tellers' workflow to efficiently assign monetary packages to a particular teller for further processing.

A second priority may be assigned to the processing of the monetary packages. For example, a monetary package may be received by a cash vault and based upon the workflow manager, may be assigned to a first teller. The second priority may be in addition to assigning the monetary package a first priority that assigns priority based upon the contents of the monetary package. Any suitable number of levels of prioritization may be assigned to the processing of the monetary packages.

Other "levels" of prioritization may include considering the customer to which the deposit belongs, the inventory levels within the financial institution, internal events that occur at the financial institution (e.g., internal change orders), risk level of the deposit, and the amount of the deposit. Still other examples include the amount of time that will be required to process a particular deposit, equipment limitations, the arrival pattern of deposits, and the amount of time remaining in the business day (i.e., how much time remains before the close business), and the like. Any characteristic of the deposit may be considered during the prioritization process.

Although not required, various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method of cash supply chain management, comprising the steps of:
   automatically identifying a monetary package at a first custody point along a cash supply chain;
   determining contents of the monetary package at the first custody point;
   assigning a priority to the monetary package at the first custody point based at least in part on the contents of the cash;
   storing information relating to the contents of the monetary package and the priority;
   distributing the contents of the monetary package to a second custody point along the cash supply chain based at least in part on at least one of the contents and the priority.

2. The method recited in claim 1, wherein the step of automatically identifying the monetary package further comprises identifying the monetary package based on an identifier transmitted by a radio-frequency identification (RFID) tag attached to the monetary package.

3. The method recited in claim 1, wherein the monetary package is a deposit bag containing a plurality of cash bags, wherein the cash bags contain at least one of cash and negotiable instruments.

4. The method recited in claim 1, wherein the monetary package is a cash strap.

5. The method recited in claim 1, wherein the first custody point and the second custody point are located within a cash handling facility.

6. The method recited in claim 1, wherein the first custody point is a first teller station within the cash handling facility and the second custody point is a second teller station within the cash handling facility.

7. The method recited in claim 6, further comprising the steps of determining a first workflow at the first teller station and determining a second workflow at the second teller station, and wherein the step of distributing the contents of the monetary package to the second custody point is based upon at least one of the first workflow and the second workflow.

8. The method recited in claim 7, wherein the step of storing the information relating to the contents of the monetary package and the priority is stored on a memory in a computing system.

9. A method of managing workflow within a cash handling facility, including the steps of:
   attaching an RFID tag to a deposit bag containing a plurality of monetary packages;
   receiving the deposit bag at a receiving point of the cash handling facility;
   detecting the physical presence of the deposit bag at the receiving point, wherein the receiving point includes an RFID scanner that is configured to receive an electronic signal from the RFID tag, the electronic signal containing information that identifies the deposit bag;
   determining an amount of cash associated with each of the monetary packages;
   determining a workload of each of a plurality of tellers;
   assigning each of the monetary packages to at least one of the tellers based at least in part on the determined workload of each of the tellers; and
   distributing each of the monetary packages to at least one teller for analysis.

10. The method recited in claim 9, wherein the step of determining the amount of cash associated with each of the monetary packages includes counting physical cash contained in each of the monetary packages.

11. The method recited in claim 10, further comprising assigning a priority to at least one of the monetary packages.

12. The method recited in claim 9, wherein the step of determining the amount of cash associated with each of the monetary packages includes weighing the monetary packages.

13. The method recited in claim 9, wherein the step of determining the amount of cash associated with each of the monetary packages is performed by a smart cart, a man trap, a smart tray, a smart table, and/or a teller.

14. The method recited in claim 9, wherein the step of determining the amount of cash associated with each of the monetary packages includes manually counting the cash in the monetary packages.

15. The method recited in claim 9, wherein the workload is determined at least in part on the estimated amount of time required by the teller to analyze the monetary package.

16. The method recited in claim 9, wherein the plurality of tellers includes a first teller having a low workload and a second teller having a high workload, wherein the monetary package is assigned to the first teller based in part on the first teller's low workload.

17. The method recited in claim 9, further comprising receiving a request for a first denomination of cash, wherein a first monetary package in the plurality of monetary packages includes the first denomination of cash, and wherein the first monetary package is assigned a priority status.

18. The method recited in claim 17, wherein the first monetary package is assigned to a first teller having a low workload.

19. The method of claim 9, wherein the assigning is further based on the determined amounts of cash associated with each of the monetary packages.

20. A system for prioritizing deposits at a cash handling facility, comprising:
   a plurality of custody points at a cash handling facility;
   a plurality of teller stations for processing contents of a monetary package;
   a radio-frequency identification (RFID) system comprising at least one RFID tag and at least one RFID scanner that is configured to detect the presence of the at least one RFID tag, wherein the RFID tag is attached to the monetary package;
   a computing system, comprising:
      a receiver configured to receive identifying information about at least one of the monetary package and the contents of the monetary package,
      a memory configured to store the information about the identity of the at least one of the monetary package packages and the contents of the monetary package, and
      a processor configured to prioritize the order in which the monetary package is assigned to a teller station for processing based at least in part on the contents of the monetary package, and to assign a priority to each of the monetary packages based at least in part on the contents of the monetary package.

21. A method comprising:
   identifying a monetary package at a first custody point along a cash supply chain;
   determining contents of the monetary package at the first custody point;
   assigning a priority based at least in part on the determined contents of the cash;
   storing, in a non-transitory computer-readable medium, data representing the determined contents and the assigned priority of the monetary package; and
   sending the contents of the monetary package to a second custody point along the cash supply chain, wherein the second custody point depends upon the determined contents and the assigned priority.

* * * * *

UNITED STATES PATENT AND TRADEMARK OFFICE
CERTIFICATE OF CORRECTION

PATENT NO. : 7,982,610 B1  Page 1 of 1
APPLICATION NO. : 12/262472
DATED : July 19, 2011
INVENTOR(S) : Michelle Nichols et al.

It is certified that error appears in the above-identified patent and that said Letters Patent is hereby corrected as shown below:

Column 14, Claim 20, Line 6:
Please delete "package"

Signed and Sealed this
Eighteenth Day of October, 2011

David J. Kappos
*Director of the United States Patent and Trademark Office*